United States Patent Office 3,784,520
Patented Jan. 8, 1974

3,784,520
SEGMENTED THERMOPLASTIC COPOLYESTERS
Guenther Kurt Hoeschele, Wilmington, Del., assignor to E. I. du Pont de Nemours and Co., Wilmington, Del.
No Drawing. Filed Jan. 26, 1972, Ser. No. 221,098
Int. Cl. C08g 17/08, 23/22
U.S. Cl. 260—75 R
9 Claims

ABSTRACT OF THE DISCLOSURE

Segmented thermoplastic copolyesters containing recurring long chain ester units derived from dicarboxylic acids and poly(alkylene oxide) glycol having a molecular weight of about 400–3500 and a carbon to oxygen ratio of about 2.0–2.4 and short chain ester units derived from dicarboxylic acids and low molecular weight diols. At least 70% of the dicarboxylic acid used is terephthalic acid and at least 70% of the low molecular weight diol is 1,4-butanediol. The short chain ester units constitute about 25–65% by weight of the polymer. Such copolyesters rapidly harden from the molten state and have outstanding physical properties over a wide range of temperatures and are especially resistant to oil swell.

BACKGROUND OF THE INVENTION

Linear copolyesters have been produced heretofore for various purposes, particularly for the production of films and fibers, but the known polymers of this type have not been as effective as would be desired for certain applications. In particular, polymers having good molding and extrusion characteristics and resistance to oil swell have not been available. In most instances where polymers come into contact with mineral oils or hydrocarbon solvents there is a tendency on the part of the polymers to swell. The swelling in turn decreases the desired physical properties of the polymer such as modulus, tensile strength, flex life and tear strength. Moreover, known copolyesters generally harden very slowly from the molten state which property greatly decreases their effectiveness in injection molding and extrusion applications. There has been a need, therefore, for a thermoplastic elastomer which would combine rapid hardening rates with superior resistance to oil swell further combined with a high level of physical properties such as tear strength, tensile strength, flex life and abrasion resistance.

SUMMARY OF THE INVENTION

According to this invention there is provided a thermoplastic copolyester consisting essentially of a multiplicity of recurring intralinear long chain and short chain ester units connected heat-to-tail through ester linkages, said long chain ester units being represented by the following structure:

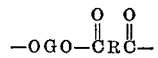

and said short chain ester units being represented by the following structure

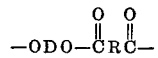

wherein:

G is a divalent radical remaining after removal of terminal hydroxy groups from a poly(alkylene oxide) glycol having a molecular weight of about 400–3500 and a carbon to oxygen ratio of about 2.0 to 2.4;
D is a divalent radical remaining after removal of hydroxyl groups from a low molecular weight diol having a molecular weight less than about 250; and
R is a divalent radical remaining after removal of carboxyl groups from a dicarboxylic acid having a molecular weight less than about 300;

with the provisos that the short chain ester units constitute about 25–65% by weight of the copolyester, at least about 70% of the R groups must be 1,4-phenylene radicals, at least about 70% of the D groups must be the 1,4-butylene radicals, and the sum of the percentages of the R groups which are not 1,4-phenylene radicals and of the D groups which are not 1,4-butylene radicals cannot exceed about 30%.

DETAILED DESCRIPTION

The term "long chain ester units" as applied to units in a polymer chain refers to the reaction product of a long chain glycol with a dicarboxylic acid. Such "long chain ester units," which are a repeating unit in the copolyesters of this invention, correspond to the Formula a above. The long chain glycols of the instant invention are poly(alkylene oxide) glycols having a molecular weight between about 400 and 3500, preferably between about 600 and 1500. Copolyesters prepared from poly(alkylene oxide) glycols having a molecular weight of about 600–1500 are preferred because they exhibit useful properties over a wide range of temperature, combined with limited water swell. Copolyesters prepared from poly(alkylene oxide) glycols having molecular weight in excess of about 3500 have unacceptable water swell (leading to poor hydrolytic stability) and poor low temperature properties. Copolyester prepared from glycols having molecular weights below about 400 have useful properties only within a narrow temperature range and are less suited for injection molding and extrusion because of a slower rate of crystallization. The long chain glycols contain a major proportion of ethylene oxide units such that the maximum carbon to oxygen ratio is about 2.0 to 2.4. In a preferred embodiment of the instant invention the long chain glycols will be entirely poly(ethylene oxide) glycol. In some instances it may be desirable to use random or block copolymers of ethylene oxide containing minor proportions of a second alkylene oxide. Typically the second monomer will constitute less than about 40 mole percent of the poly(alkylene oxide) glycols and preferably less than 20 mole percent. Representative examples of the second monomer include 1,2- and 1,3-propylene oxides, 1,2-butylene oxide and tetrahydrofuran. It should be noted that regardless of the second monomer utilized in the poly(alkylene oxide) glycol the carbon to oxygen ratio must be no more than about 2.4. It is also possible to use mixtures of poly(ethylene oxide) glycol and a second poly(alkylene oxide) glycol such as poly(1,2-propylene oxide) glycol or poly(tetramethylene oxide) glycol as long as the requirement that the carbon to oxygen ratio is no more than about 2.4 is met. The carbon to oxygen ratio of about 2.0–2.4, of course, is meant to include lower molecular weight poly(alkylene oxide) glycols such as poly(ethylene oxide) glycol of 400 molecular weight in which the carbon to oxygen ratio is 1.8 since the 2.0 to 2.4 ratio does not take into account the elements of water, which are present in the glycol in addition to the alkylene oxide units, but are spilt out and are not part of the polymer.

Maximum resistance to oil swell is obtained with copolyesters based on poly(ethylene oxide) glycol alone. In some instances improvement of low temperature properties can be obtained by using poly(alkylene oxide) glycol copolymers or mixtures of poly(alkylene oxide) glycols but at the expense of resistance to oil swell.

The term "short chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by Formula b above.

Included among the low molecular weight diols (other than 1,4-butanediol) which react to form short chain ester units are acyclic, alicyclic and aromatic dihydroxy compounds. Preferred are diols with 2-15 carbon atoms such as ethylene, propylene, isobutylene, tetramethylene, pentamethylene, 2,2-dimethyltrimethylene, hexamethylene and decamethylene glycols, dihydroxy cyclohexane, cycyohexane dimethanol, resorcinol, hydroquinone, 1,5-dihydroxy naphthalene, etc. Especially preferred are aliphatic diols containing 2-8 carbon atoms. Included among the bis-phenols which can be used are bis(p-hydroxy) diphenyl, bis(p-hydroxyphenyl) methane, and bis(p-hydroxyphenyl) propane. Equivalent esterforming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids (other than terephthalic acid) which are reacted with the foregoing long chain glycols and low molecular weight diols to produce the copolyesters of this invention are aliphatic, cycloaliphatic or aromatic dicarboxylic acids of a low molecular weight, i.e., having a molecular weight of less than about 300. The term "dicarboxylic acids" as used herein, includes acid equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer in the elastomeric compositions of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_3$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethyl-malonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthylene dicarboxylic acid, 4,4-bicyclohexyl dicarboxylic acid, decahydro-2,6-naphthylene dicarboxylic acid, 4,4-methylenebis-(cyclohexyl) carboxylic acid, 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include phthalic and isophthalic acids, bibenzoic acid, substituted dicarboxy compounds with two benzene nuclei such as bis(p-carboxyphenol) methane, p-oxy(p-carboxyphenyl) benzoic acid, ethylene-bis(p-oxybenzoic acid) 1,5-naphthalene dicarboxylic acid, 2,6-naphthalene dicarboxylic acid, 2,7-naphthalene dicarboxylic acid, phenanthralene dicarboxylic acid, anthralene dicarboxylic acid, 4,4'-sulfonyl dibenzoic acid and $C_1$-$C_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are a preferred class for preparing the copolyester polymers useful for compositions of this invention. Among the aromatic acids, those with 8-16 carbon atoms are preferred, particularly the phenylene dicarboxylic acids, i.e., phthalic and isophthalic acids.

It is essential that at least about 70 mole percent of the discarboxylic acid incorporated into the polymer be terephthalic acid and at least about 70 mole percent of the low molecular weight diol incorporated into the polymer be 1,4-butanediol. Thus, at least 70% of the R groups in Formulae a and b above are 1,4-phenylene radicals and at least about 70% of the D groups in Formula b above are 1,4-butylene radicals. A further requirement in making the polymers of this invention is that the sum of the percentages of the R groups which are not 1,4-phenylene radicals and of the D groups which are not 1,4-butylene radicals cannot exceed about 30%. For example, if 30% of the low molecular weight diol molecules incorporated into the polymer are other than 1,4-butanediol, then all of the dicarboxylic acid used must be terephthalic acid, or if 10% of the low molecular weight diol molecules are other than 1,4-butanediol, then at least about 80% of the dicarboxylic acid used must be terephthalic acid. Copolyesters having fewer 1,4-butylene terephthalate units than is assured by the foregoing proportions do not have sufficiently rapid hardening rates. The D and R units which are not 1,4-butylene and 1,4-phenylene, respectively, can be derived from any of the low molecular weight diols or dicarboxylic acids named above.

The dicarboxylic acids or their derivatives and the polymeric glycol are incorporated into the final product in the same molar proportions as are present in the reaction mixture. tThe amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of glycol incorporated is still the difference between moles of diacid and polymeric glycol.

The copolyesters of this invention contain about 25–65% by weight of short chain ester units corresponding to Formula b above, the remainder being long chain ester units corresponding to Formula a above. When the copolyesters contain less than about 25% by weight short chain units, the tear strength and solvent resistance of the copolyesters fall to undesirably low levels and when the copolyesters contain more than about 65% short chain units, the low temperature properties worsen and the copolyesters become less elastomeric. The preferred balance of properties is obtained when the short chain ester content is about 55–62%.

The most preferred copolyesters of this invention are those prepared from dimethylterephthalate, 1,4-butanediol and poly(ethylene oxide) glycol having a molecular weight from about 600–1500.

The polymers described herein can be made conveniently by a conventional ester interchange reaction. A preferred procedure involves heating the dimethyl ester of terephthalic acid with a long chain glycol and a molar excess of a butanediol in the presence of a catalyst at 150 to 260° C. followed by distilling off methanol formed by the interchange. Heating is continued until methanol evolution is complete. Depending on temperature, catalyst and glycol excess, this polymerization is complete within a few minutes to a few hours. This procedure results in the preparation of a low molecular weight prepolymer which can be carried to a high molecular weight copolyester of this invention by the procedure described below. Such prepolymers can also be prepared by a number of alternate esterification or ester interchange processes; for example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long chain glycol.

The resulting prepolymer is then carried to high molecular weight by distillation of the excess of short chain diol. This process is known as "polycondensation." Additional ester interchange occurs during this distillation to increase the molecular weight and to randomize the arrangement of the copolyester units. Best results are usually obtained if this final distillation or polycondensation is run at less than 1 mm. pressure and 240–260° C. for less than 2 hours in the presence of antioxidants such as sym-di-beta-naphthyl-p-phenylene-diamine and 1,3,5-trimethyl-2,4,6 - tris[3,5 - ditertiarybutyl - 4 - hydroxybenzyl] benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as

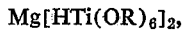

$$Mg[HTi(OR)_6]_2,$$

derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terephenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyesters of this invention possess many desirable properties, it is sometimes advisable to stabilize certain of the compositions to heat or radiation by ultraviolet light. Fortunately, this can be done very readily by incorporating stabilizers in the polyester composition. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 4,4' - bis(2,6 - ditertiary-butylphenol) 1,3,5 - trimethyl-2,4,6-tris[3,5-ditertiary - butyl - 4 - hydroxybenzyl]benzene and 4,4' - butylidene-bis(6-tertiary-butyl-m-cresol). Various inorganic metal salts or hydroxides can be used as well as organic complexes such as nickel dibutyl dithiocarbamate, manganous salicylate and copper 3-phenyl-salicylate. Typical amine stabilizers include N,N'-bis(beta-naphthyl)-p-phenylenediamine, N,N' - bis (1-methylhelptyl)-p-phenylene diamine and either phenylbetanaphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones or benzotriazoles.

The properties of these copolyesters can be modified by incorporation of parious conventional inorganic fillers such as carbon black, silica gel, alumina, clays and chopped fiber glass. In general, these additives have the effect of increasing the modulus of the material at various elongations. Compounds having a range of hardness values can be obtained by blending hard and soft polyesters of this invention.

The copolyesters of this invention have superior physical properties. They are particularly outstanding in their resistance to swell in non-polar liquids, abrasion resistance and general low temperature properties. They are especially effective in injection molding applications and their relatively low melt viscosity (particularly at low shear), excellent thermal stability at processing temperature, rapid hardening rates and good flow and mold setting characteristics allow the polymers of this invention to be processed by substantially all procedures which have been used for thermoplastics in general and, in many instances, they offer significant processing advantage over competitive thermoplastic polymers. The materials can be injection, compression, transfer and blow molded to form elastic molded articles (such as tires), which may include inserts, if desired, meeting close tolerances. They can be readily extruded to produce films (blown or unblown), tubing, other forms having complicated cross sections, and cross-head extruded for hose (particularly for carrying oil), wire, cable and other substrate covers. They can also be readily calendered to produce films and sheeting or to produce calendar-coat woven and non-woven fabrics and other substances.

In finely divided form, the polymers of this invention offer the above-mentioned processing advantages for procedures employing powdered thermoplastics. In addition, they can be used in crumb form. The unique flow characteristics of these polymers give excellent definition on molded surfaces and facilitate fusion bonding procedures such as rotational molding (either one or two axis methods), slush molding, and centrifugal molding as well as powder coating techniques such as fluidized bed, electrostatic spray, flame spray, flock coating, powder flow coating, cloud chamber and heat fused coating (for flexible substrates).

The melt viscosity and stability characteristics of these polymers offer advantages for use in certain coating and adhesive procedures such as dip, transfer, roller and knife coating and hot melt adhesives. These same advantages are useful in various combining and laminating operations such as hot roll, web and flame laminating as well as other thermoplastic heat sealing processes. The low melt viscosity of these polymers permits the use of more delicate substrates in combining, laminating and calendering operations and allows penetration into the substrate, if desired.

All parts, proportions and percentages disclosed herein are by weight unless otherwise indicated. The following examples further illustrate the invention.

The following ASTM methods are employed in determining the properties of the polymers prepared in the examples which follow.

| | |
|---|---|
| Modulus at 100/ elongation, $M_{100}$ | D412 |
| Modulus at 300% elongation, $M_{300}$ | D412 |
| Tensile at break, $T_B$ | D412 |
| Elongation at break, $E_B$ | D412 |
| Hardness, Shore A | D676 |
| Hardness, Shore D | D1484 |
| Bashore resilience | D1054 |
| Oil swell | D471 |
| Trouser tear | [1] D470 |
| Clash-Berg torsional stiffness | D1053 |
| Brittle temperature | D746 |

[1] Modified by use of 1.5" x 3" sample with 1.5" cut on the long axis of the sample. This configuration prevents "necking down" at the point of tearing.

The following catalysts are used in preparing the compositions of the examples:

CATALYST A

To 425 parts of 1,4-butanediol is added 22.37 parts of tetrabutyl titanate. The mixture is agitated at 50° C. for 2–3 hours until the small amount of solids originally present disappear.

CATALYST B

To 200 ml. of dry methanol is added 11.2 g. of anhydrous magnesium acetate and the mixture is refluxed for 2 hours. The resulting solution is cooled to room temperature and 44.4 ml. of tetrabutyl titanate and 150 ml. of 1,4-butanediol are added with mixing.

EXAMPLE 1

A copolyester is prepared by placing the following materials in an agitated flask fitted for distillation:

| | Parts |
|---|---|
| Poly(ethylene oxide) glycol; number average molecular weight about 600 | 19.3 |
| 1,4-butanediol | 19.4 |
| Dimethyl terephthalate | 34.1 |
| Sym-di-beta-naphthyl-p-phenylenediamine | 0.17 |
| Catalyst B | 0.4 |

A stainless steel stirrer with a paddle cut to conform with the internal radius of the flask is positioned about ⅛″ from the bottom of the flask. Air in the flask is replaced with nitrogen. The flask is placed in an oil bath at 160° C. and the catalyst is added after the reaction mixture liquifies. Agitation is initiated. Methanol distills from the reaction mixture as the temperature is slowly raised to 250° C. over a period of 35 minutes. When the temperature reaches 250° C. the pressure is gradually reduced to 0.1 mm. Hg over a period of 50 minutes. The polymerization mass is agitated at 250–260° C./0.04 mm. Hg for 2 hours. The resulting viscous molten product is scraped from the flask in a nitrogen (water and oxygen free) atmosphere and allowed to cool. The inherent viscosity of the product at a concentration of 0.1 g./dcl. in m-cresol at 30° C. is 1.29. Samples for physical testing are prepared by compression molding at 232° C. The polymer has a Shore D hardness of about 56.

The copolyester has the following physical properties:

| | |
|---|---|
| $M_{100}$, p.s.i. | 1915 |
| $M_{300}$, p.s.i. | 2390 |
| $T_B$, p.s.i. | 5840 |
| $E_B$, percent | 680 |
| Trouser tear, 50″/min., p.l.i. | 200 |
| Clash-Berg, $T_{10,000}$, ° C. | −9.3 |
| Volume swell/7 days/100° C., ASTM No. 3 oil, percent | 5.0 |
| Volume swell/7 days/70° C., ref. fuel B, percent | 10.0 |
| Butylene terephthalate units, percent by weight, calculated | 57.4 |

EXAMPLE 2

A copolyester is prepared from the following materials:

| | Parts |
|---|---|
| Poly(ethylene oxide) glycol, number average molecular weight about 1000 | 38.5 |
| 1,4-butanediol | 36.5 |
| Dimethyl terephthalate | 60.0 |
| Sym-di-beta-naphthyl-p-phenylenediamine | 0.3 |
| Catalyst B | 0.71 |

The procedure is substantially that used in Example 1 with the exception that polycondensation is conducted at 250° C. and 0.07 mm. for 110 minutes.

The inherent viscosity of the polymer is 1.66. The polymer has a Shore D hardness of 56. By calculation, it contains 57.7% by weight butylene terephthalate units.

Samples for physical testing are prepared by compression molding at 232° C. The polymer has the following physical properties.

Stress-strain at 25° C.:

| | |
|---|---|
| $M_{100}$, p.s.i. | 2140 |
| $M_{300}$, p.s.i. | 2550 |
| $T_B$, p.s.i. | 4500 |
| $E_B$, percent | 580 |

Stress-strain at 150° C.:

| | |
|---|---|
| $M_{100}$, p.s.i. | 640 |
| $M_{300}$, p.s.i. | 930 |
| $T_B$, p.s.i. | >2095 |
| $E_B$, percent | >630 |
| Trouser tear, 50″/min., p.l.i. | 310 |
| Brittle point, ° C. | −58 |
| Clash-Berg, $T_{10,000}$, ° C. | −21 |
| Volume swell/7 days/100° C., ASTM No. 3 oil, percent | 4.1 |
| Volume swell/7 days/70° C., ref. fuel B, percent | 11.8 |

Two control copolyesters are prepared substantially by the procedure of this example with the exception that one is based on poly(tetramethylene oxide) glycol of 1000 molecular weight [Control 2A] and the other is based on poly(1,2-propylene oxide) glycol of 1000 molecular weight [Control 2B]. Control polymers 2A and 2B are found to have physical properties substantially equivalent to the poly(ethylene oxide) glycol polymer of this example with the exception of volume swell in hydrocarbon liquids which is shown in the following table:

| | Copolyester Ex. 2 | Control 2A | Control 2B |
|---|---|---|---|
| Volume swell/7 days/100° C. ASTM No. 3 oil, percent | 4.1 | 12.8 | 12.2 |
| Volume swell/7 days/70° C., ref. fuel B, percent | 11.8 | 23.9 | 21.7 |

Thus it is seen that the copolyester prepared according to the process of the instant invention is superior, with regard to volume swell when compared to copolyester having carbon to oxygen ratio above about 2.4.

EXAMPLE 3

A copolyester is prepared from the following materials:

| | Parts |
|---|---|
| Poly(ethylene oxide) glycol, number average molecular weight about 985 | 466 |
| 1,4-butanediol | 290 |
| Dimethyl terephthalate | 414 |
| Dimethyl isophthalate | 120 |
| Sym-di-beta-naphthyl-p-phenylene-diamine | 3 |
| Catalyst A | 20 |

The procedure is substantially that used in Example 1 with the exception that polycondensation is conducted at about 255° C. and 0.1 mm. Hg for 90 minutes.

The inherent viscosity of the polymer in m-cresol is 1.66. The polymer has a Shore A hardness of 92. It contains 37.9% by weight of butylene terephthalate units and 11.0% by weight butylene isophthalate units.

Samples for physical testing are prepared by compression molding at 216° C. The polymer has the following physical properties:

| | |
|---|---|
| $M_{100}$, p.s.i. | 1000 |
| $M_{300}$, p.s.i. | 1320 |
| $T_B$, p.s.i. | 3650 |
| $E_B$, percent | 940 |
| Clash-Berg, $T_{10,000}$, ° C. | −41 |
| Resilience, Bashore, percent | 64 |
| Trouser tear, 50″/min., p.l.i. | 160 |
| Volume swell/7 days/100° C., ASTM No. 3 oil, percent | 7.8 |

A control copolyester is prepared substantially by the procedure of this example with the exception that it is based on poly(tetramethylene oxide) glycol of 1000 molecular weight in place of poly(ethylene oxide) glycol. The control polyester is found to have a volume swell/7 days/100° C., ASTM No. 3 oil of 24.1%.

EXAMPLE 4

A copolyester is prepared from the following materials:

| | Parts |
|---|---|
| Poly(ethylene oxide) glycol, number average molecular weight about 3200 | 22.5 |
| 1,4-butanediol | 19.4 |
| Dimethyl terephthalate | 29.2 |
| Sym-di-beta-naphthyl-p-phenylene-diamine | 0.17 |
| Catalyst B | 0.4 |

The procedure is substantially that used in Example 1 with exception that polycondensation is conducted at 250–260° C. and 0.04 mm. Hg for 130 minutes.

The inherent viscosity of the polymer in m-cresol is 1.67. The polymer has a Shore D hardness of 55. It contains 57.4% by weight of butylene terephthalate units.

Samples for physical testing are prepared by compression molding at 232° C. The polymer has the following physical properties:

| | |
|---|---|
| $M_{100}$, p.s.i. | 1970 |
| $M_{300}$, p.s.i. | 2525 |
| $T_B$, p.s.i. | 5850 |
| $E_B$, percent | 700 |
| Clash-Berg, $T_{10,000}$, ° C. | 9 |
| Trouser tear, 50″/min., p.l.i. | 146 |

A second copolyester is prepared by the procedure of this example with the exception that the poly(ethylene oxide) glycol is replaced by an equal weight of a block copolymer (number average molecular weight about 3200) prepared by condensing ethylene oxide with polypropylene ether glycol having a number average molecular weight of 700. This block copolymer has a C/O ratio of about 2.14. The copolyester prepared from the block copolymer has substantially the same properties exhibited by the copolyester prepared from poly(ethylene oxide) glycol having a molecular weight of 3200.

What is claimed is:

1. A segmented thermoplastic copolyester elastomer having improved resistance to oil swell consisting essentially of a multiplicity of recurring long chain ester units and short chain ester units joined head-to-tal through ester linkages, said long chain ester units being represented by the formula (I) 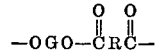

and said short chain units being represented by the formula (II) 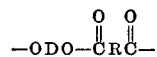

where G is a divalent radical remaining after the removal of terminal hydroxyl groups from a poly(alkylene oxide) glycol having a molecular weight of about 400–3500 and a carbon to oxygen ratio of about 2.0–2.4; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided, (a) said short chain ester units amount to about 25–65% by weight of said copolyester, (b) at least about 70% of the R groups in Formulae I and II are 1,4-phenylene radicals and at least about 70% of the D groups in Formula II are 1,4-butylene radicals, and (c) the sum of the percentages of R groups which are not 1,4-phenylene radicals and of D groups which are not 1,4-butylene radicals does not exceed about 30.

2. A segmented copolyester of claim 1 wherein the poly(alkylene oxide) glycol is poly(ethylene oxide) glycol.

3. A segmented copolyester of claim 2 wherein the polyethylene oxide glycol has a molecular weight of about 600–1500.

4. A segmented thermoplastic copolyester of claim 1 wherein substantially all of the dicarboxylic acid reactant is terephthalic acid.

5. A segmented thermopalstic copolyester of claim 1 wherein the dicarboxylic acid reactant is a mixture of terephthalic acid and isophthalic acid.

6. A segmented thermoplastic copolyester of claim 1 wherein substantially all of the diol having a molecular weight less than 250 is 1,4-butanediol.

7. A segmented copolyester of claim 1 wherein the short chain ester units constitute about 55–62% by weight of the polymer.

8. A segmented copolyester of claim 1 wherein the dicarboxylic acid is terephthalic acid, the polyethylene oxide glycol has a molecular weight of about 600–1500 and the diol having a molecular weight less than 250 is 1,4-butanediol.

9. A segmented copolyester of claim 8 wherein the short chain ester units constitute about 55–62% by weight of the polymer.

References Cited
UNITED STATES PATENTS
3,023,192  2/1962  Shivers.

MELVIN GOLDSTEIN, Primary Examiner

U.S. Cl. X.R.

260—45.7 A, 45.75 N, R, C, 45.9 R, 45.95, 860